United States Patent
Baghsorkhi et al.

(10) Patent No.: US 9,720,667 B2
(45) Date of Patent: Aug. 1, 2017

(54) AUTOMATIC LOOP VECTORIZATION USING HARDWARE TRANSACTIONAL MEMORY

(71) Applicant: Intel Corporation, Santa Clara, CA (US)

(72) Inventors: Sara S. Baghsorkhi, San Jose, CA (US); Albert Hartono, Santa Clara, CA (US); Youfeng Wu, Palo Alto, CA (US); Nalini Vasudevan, Sunnyvale, CA (US); Cheng Wang, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/222,040

(22) Filed: Mar. 21, 2014

(65) Prior Publication Data
US 2015/0268940 A1 Sep. 24, 2015

(51) Int. Cl.
*G06F 9/45* (2006.01)

(52) U.S. Cl.
CPC .................. *G06F 8/452* (2013.01)

(58) Field of Classification Search
CPC ...................................... G06F 8/452
See application file for complete search history.

(56) References Cited

U.S. PATENT DOCUMENTS

| | | | |
|---|---|---|---|
| 2006/0004996 A1* | 1/2006 | Gonion | G06F 8/443 712/241 |
| 2009/0217253 A1* | 8/2009 | Song | G06F 8/456 717/161 |
| 2012/0066482 A1 | 3/2012 | Gonion | |
| 2012/0254592 A1* | 10/2012 | San Adrian | G06F 9/30043 712/205 |
| 2012/0254888 A1* | 10/2012 | Kalogeropulos et al. | 718/107 |
| 2013/0332701 A1 | 12/2013 | Bharadwaj et al. | |

(Continued)

FOREIGN PATENT DOCUMENTS

| | | |
|---|---|---|
| WO | 2013095608 A1 | 6/2013 |
| WO | 2013095642 A1 | 6/2013 |

*Primary Examiner* — Li B Zhen
*Assistant Examiner* — Sen Chen
(74) *Attorney, Agent, or Firm* — Barnes & Thornburg LLP

(57) ABSTRACT

Technologies for automatic loop vectorization include a computing device with an optimizing compiler. During an optimization pass, the compiler identifies a loop and generates a transactional code segment including a vectorized implementation of the loop body including one or more vector memory read instructions capable of generating an exception. The compiler also generates a non-transactional fallback code segment including a scalar implementation of the loop body that is executed in response to an exception generated within the transactional code segment. The compiler may detect whether the loop contains a memory read dependent on a condition that may be updated in a previous iteration or whether the loop contains a potential data dependence between two iterations. The compiler may generate a dynamic check for an actual data dependence and an explicit transactional abort instruction to be executed when an actual data dependence exists. Other embodiments are described and claimed.

19 Claims, 12 Drawing Sheets

(56) References Cited

U.S. PATENT DOCUMENTS

| | | | |
|---|---|---|---|
| 2013/0339796 A1* | 12/2013 | Greiner | G06F 9/30058 |
| | | | 714/37 |
| 2014/0013090 A1* | 1/2014 | Zalmanovici | G06F 8/443 |
| | | | 712/244 |
| 2014/0089634 A1 | 3/2014 | Lee et al. | |
| 2014/0181580 A1 | 6/2014 | Bharadwaj et al. | |
| 2014/0189667 A1* | 7/2014 | Kanhere et al. | 717/160 |
| 2014/0208065 A1* | 7/2014 | Ould-Ahmed-Vall | 712/5 |
| 2014/0281723 A1* | 9/2014 | Archer | G06F 11/3409 |
| | | | 714/37 |
| 2014/0359253 A1* | 12/2014 | Gonion | 712/9 |
| 2015/0074373 A1* | 3/2015 | Sperber et al. | 712/7 |

\* cited by examiner

```
           for (i = 0; i < N; i++) {
             if (arr1[i] < min_x) {
               x = arr1[i];
               idx = arr2[i];
               x += arr3[idx] ;
               if (x < min_x) {
                 min_x = x;
               }
             }
           }
```

FIG. 4A

```
for (i⃗ in N step L) {  ← 502
    transaction {
        // Vectorized loop body for L scalar iterations of i⃗
        // Conditional loads/gathers
    } catch transaction abort {
        // scalar fallback loop body
        // scalar iteration for i⃗[0]
        // scalar iteration for i⃗[1]
        // ...
        // scalar iteration for i⃗[L-1]
    }
}
```

FIG. 5

```
i⃗ = [0 1 ... L-1];      ← 502
loop:
transaction {
    for (t = 0; t < T; t++) {    ← 602
        // Vectorized loop body for L scalar iterations of i⃗
        // Conditional loads/gathers
        i⃗ = i⃗ + L;    ← 604
    }
} catch transaction abort {     ← 510
    // scalar fallback loop body for L * T iterations
    // scalar iteration for i⃗[0]
    // scalar iteration for i⃗[1]
    // ...
    // scalar iteration for i⃗[(L*T)-1]
}
if (i⃗ < N) goto loop;
                         ← 502
```

FIG. 6

```
                                              ,502
for (i in N⃗ step L) {
       ↳ transaction {
504    506 ↳ // Vectorized loop body for L scalar iterations of i
    804
       ↳    if (memory communication between elements) {
    806 ↳        abort;
           }
    802
       ↳    // Potential memory communication between elements
       } catch transaction abort {
           // scalar fallback loop body         510
           // scalar iteration for i[0]
           // scalar iteration for i[1]
           // ...
           // scalar iteration for i[L-1]
       }                                        512
}
```

```
for (i = 0; i < N; i++) {
    if (arr1[i] < min_x) {
        idx = arr2[i];
        x = arr1[i];
        x += arr3[idx];
        arr3[idx] += arr1[i];
        if (x < min_x) {
            min_x = x;
            best_i = i;
        }
    }
}
```

```
// L stands for vector length
v_N[0:L-1] = Broadcast (N);
v_min_x[0:L-1] = Broadcast (min_x);
v_best_i[0:L-1] = Broadcast (best_i);
i = 0;

Loop:        ← 502        ← 504
if ((status = _xbegin()) == _XBEGIN_STARTED) {

// init v_i reg with values "i", "i+1", etc.
        v_i[0:L-1] = StrideBroadcast(i, 1);
506     k0 = Compare(v_i[0:L-1] < v_N[0:L-1]);
        v_arr1[0:L-1] = MaskedLoad (&arr1[i], k0);
        k1 = MaskedCompare(v_arr1[0:L-1] < v_min_x[0:L-1], k0);

if (k1) {
            v_idx[0:L-1] = MaskLoad( &(arr2[i]), k1);
508         vbitsx[0:L-1] = MaskGather( vbitsx[0:L-1], &arr3,
                                         v_idx[0:L-1], k1);
            v_x = v_arr1[0:L-1] + vbitsx [0:L-1];

804         // Processor instruction: detect index conflicts
            k2 = MaskedVConflict(v_idx[0:L-1], v_idx[0:L-1], k1);
            if(k2)
        806     _xabort();

802     MaskedScatter(v_x[0:L-1], &arr3, v_idx[0:L-1], k1);
        k2 = MaskCompare( v_x[0:L-1] < v_min_x[0:L-1], k1);

// Processor inst: set bits of k3 mask till and
        // including the first set bit of k2 – can be emulated
        k3 = kfirsttrue(k2, _FT_INCL);
        k4 = k2 & k3;

v_min_x[0:L-1] = MaskMove(v_x[0:L-1], k4 );
        v_best_i[0:L-1] = MaskMove(v_i[0:L-1], k4 );

// Processor instruction: broadcast the last set
        // element in v_min_x based on k4
        v_min_x[0:L-1] = select( k4,v_min_x[0:L-1],
                _SEL_LAST);

```
                // Processor instruction: broadcast the last set              902
                // element in v_best_i based on k4
                v_best_i[0:L-1] = select( k4, v_best_i[0:L-1],
                        _SEL_LAST ));

// number of scalar iterations processed via partial      // vectorization pc = popcnt(k3);
                } else {
                        pc = L;
                }

// pc is the number of scalar iterations packed into this
                // vector iteration
                        i += pc;
                                        510
        } else {
                // Scalar fallback code for next L scalar iterations
                // ...
                //                      512 v_min_x[0:VL-1] = Broadcast (min_x);
                v_best_i[0:VL-1] = Broadcast (best_i);
        } if(i < N)               502
                goto Loop;

//get the last vector element of vec reg v_min_x
min_x = convertToScalar(v_min_x[0:L-1]);
//get the last vector element of vec reg v_best_i
best_i = convertToScalar(v_best_i[0:L-1]);
```

FIG. 9C

AUTOMATIC LOOP VECTORIZATION USING HARDWARE TRANSACTIONAL MEMORY

BACKGROUND

Modern microprocessors typically include support for performing operations on multiple items of data simultaneously. In particular, many microprocessors include support for vector instructions. A vector instruction defines a single operation that is to be performed upon several different operands. A microprocessor may execute the vector instruction as a single instruction, operating on the different operands simultaneously. One commercially available example of vector instruction support is Intel® Advanced Vector Extensions 2 (Intel® AVX2), available on certain processors manufactured by Intel® Corporation. Programmers may take advantage of vector support in microprocessors by writing critical sections such as loops in assembly language. Additionally, optimizing compilers may automatically vectorize some loops that are written in high-level source code.

Some microprocessors provide support for hardware transactional memory. Transactional memory allows the programmer to designate a segment of code called a "transaction" to execute independently and atomically. That is, memory operations occurring within the transaction are not visible to other transactions or threads executing on the computing system until the transaction is successfully committed. After a successful commit, all memory changes made during the transaction are instantaneously available to other threads on the system. Transactional memory may be implemented by speculatively executing the transaction, detecting any memory conflicts that occur during execution of the transaction, and then aborting and rolling back the transaction in response to memory conflicts. Memory conflicts include, for example, a transaction attempting to write to a memory location that has already been read or written-to by another transaction. Transactional memory may simplify the programming model for parallel computing. One commercially available example of hardware transactional memory support is Transactional Synchronization Extensions (Intel® TSX), available on certain processors manufactured by Intel® Corporation.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4A illustrates example pseudocode of a source code loop;

FIG. 5 illustrates example pseudocode of vectorized code that may be generated by the computing device of FIGS. 1 and 2;

FIG. 6 illustrates example pseudocode of vectorized code with a loop tiling optimization that may be generated by the computing device of FIGS. 1 and 2;

FIG. 9A illustrates example pseudocode of a source code loop; and

FIGS. 9B and 9C illustrate example pseudocode of partially vectorized code that may be generated by the computing device of FIGS. 1 and 2.

DETAILED DESCRIPTION OF THE DRAWINGS

Figure 1:
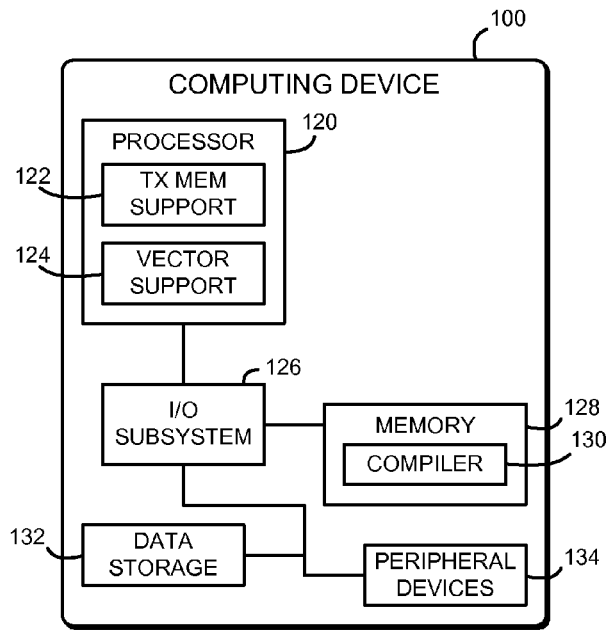
FIG. 1 is a simplified block diagram of at least one embodiment of a computing device for automatic loop vectorization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for automatic loop vectorization includes a processor 120, an I/O subsystem 126, and a memory 128. The memory 128 includes an optimizing compiler 130. In use, as described below, the compiler 130 is configured to optimize source code that may include loops. The compiler 130 may perform automatic vectorization of loops within the source code; that is, the compiler 130 may transform the loop to use vector instructions to operate on more than one data operand at a time. The compiler 130 may use hardware transactional memory support to prevent spurious exceptions in generated code as well as to correct dynamic data dependences in vectorized loops. The compiler 130 may improve the performance of generated code by increasing the number of loops that may be vectorized, without requiring additional specialized processor instructions.

The computing device 100 may be embodied as any type of device capable of automatic loop vectorization and otherwise performing the functions described herein. For example, the computing device 100 may be embodied as, without limitation, a computer, a desktop computer, a workstation, a server computer, a laptop computer, a notebook computer, a tablet computer, a smartphone, a distributed computing system, a multiprocessor system, a consumer electronic device, a smart appliance, and/or any other computing device capable of automatic loop vectorization. As shown in FIG. 1, the illustrative computing device 100 includes the processor 120, the I/O subsystem 126, the memory 128, and a data storage device 132. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. The processor 120 further includes transactional memory support 122 and vector support 124.

The transactional memory support 122 allows the processor 120 to speculatively execute segments of code known as transactions. Transactions are atomic, meaning that memory operations performed by a transaction while the transaction is pending are not visible to other transactions, logical processors, and/or threads of the processor 120. When a transaction is completed, also known as committed, all of the memory operations of the transaction become available to the rest of the computing device 100 at once. When memory accesses within a transaction conflict with another transaction or thread or when the processor 120 receives an exception or an interrupt, the processor 120 may abort the conflicting transaction(s), discarding any associated in-progress transactional memory changes. The processor 120 may detect conflicting memory locations at any level of granularity, for example per cache line, per word, or per memory cell. On abort, the processor 120 may call an abort handler, restart the transaction (once or multiple times), or invoke non-transactional fallback code in response to an aborted transaction. In some embodiments, the transactional memory support 122 may be embodied as Intel® Transactional Synchronization Extensions (Intel® TSX), available on certain processors 120 manufactured by Intel® Corporation.

The vector support 124 allows the processor 120 to execute vector instructions that operate on a number of operands simultaneously. Vector instructions may be used by the processor 120 to exploit data-level parallelism and thereby improve performance. For example, a vector instruction may perform the same mathematical operation on a number of operands stored in a vector register of the processor 120. Each operand of the vector instruction may also be referred to as an element of the vector instruction, vector register, or memory location. The number of elements operated on by a vector instruction may be referred to as the vector length, and the processor 120 may support a number of different vector lengths. Vector instructions may support predicate masks, which are bit fields used to activate particular elements of a vector instruction. Predicate masks allow for conditional execution of particular elements within a single vector instruction. In some embodiments, the vector support 124 may be embodied as an instruction set architecture extension such as Intel® Advanced Vector Extensions 2 (Intel® AVX2), Intel® Advanced Vector Extensions (Intel® AVX), Intel® MMX, Single Instruction Multiple Data (SIMD) instructions, or other vector extensions available with the processor 120.

The memory 128 may be embodied as any type of volatile or non-volatile memory or data storage capable of performing the functions described herein. In operation, the memory 128 may store various data and software used during operation of the computing device 100 such as the compiler 130, operating systems, applications, programs, libraries, and drivers. The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage 132 may be embodied as any type of device or devices configured for short-term or long-term storage of data such as, for example, memory devices and circuits, memory cards, hard disk drives, solid-state drives, or other data storage devices. The data storage 132 may store program files and data for the compiler 130, as well as source code files and output object and executable files. As discussed further below, the compiler 130 automatically vectorizes loops as the compiler 130 translates source code into object code or executable code.

In some embodiments, the computing device 100 may also include one or more peripheral devices 134. The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, and/or other input/output devices, interface devices, and/or peripheral devices.

Figure 2:
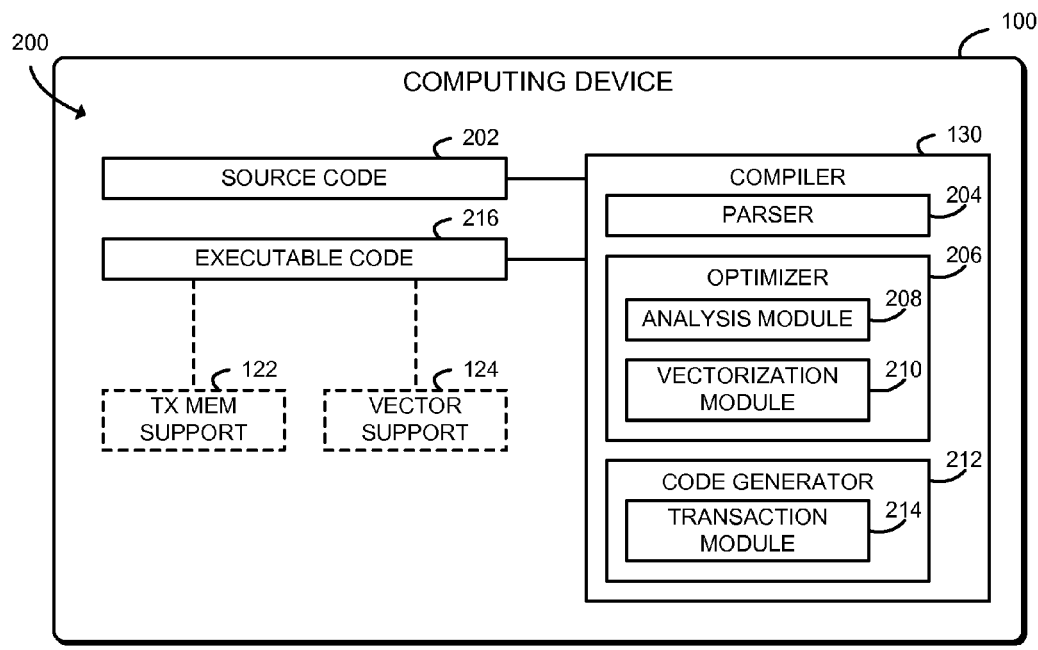
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes source code 202, the compiler 130, and executable code 216. The various modules and/or components of the environment 200 may be embodied as hardware, firmware, software, or a combination thereof.

The source code 202 includes symbols that may be translated into machine-executable code. The source code 202 may include typical source code features such executable statements, control flow statements, loops, conditional statements, data structures, and the like. In particular, the source code 202 may include one or more loop constructs, as described below. The source code 202 may be embodied as C or C++ code, FORTRAN code, Java code, C# code, Objective C code, or any other computer code accepted by the compiler 130.

The compiler 130 is configured to process the source code 202 and produce the executable code 216. The compiler 130 may process the source code 202 in stages, for example, first parsing the source code 202 to build an intermediate representation of the source code 202, then optimizing the intermediate representation of the source code 202, and last generating executable code 216 based on the intermediate representation. In some embodiments, those functions may be performed by sub-modules, for example by a parser 204, an optimizer 206, or a code generator 212. The compiler 130 may optimize the intermediate representation by analyzing the source code 202 to detect loops and potential conditional dependences or data dependences within the loops. The compiler 130 may also optimize the intermediate representation by transforming the scalar loop into a vectorized implementation, including a number of appropriate vector instructions. In some embodiments, those functions may be performed by sub-modules, for example by an analysis module 208 or a vectorization module 210. The compiler 130 may generate the executable code 216 to include one or more transactional code segments containing the vectorized loop body. The compiler 130 may generate the transactional code segments using the particular instructions or other techniques provided by the transaction support 122 of the processor 120. In some embodiments, those functions may be performed by sub-modules, for example by a transaction module 214.

The executable code 216 includes machine-executable code generated by the compiler 130 based on the source code 202. The executable code 216 may be embodied as binary code directly executable on a computing device (e.g., computing device 100), binary object code that may be linked with other code to produce an executable, precompiled header files that may be incorporated into an executable, or any other output file typically produced by an optimizing compiler. In the illustrative embodiment, the executable code 216 is targeted to the particular computer instruction set and/or otherwise targeted to the architecture of the computing device 100. Additionally or alternatively, in other embodiments, the executable code 216 may be executable by a target computing device other than the computing device 100 (not shown). In such embodiments, the compiler 130 may be a so-called "cross compiler."

Figure 3A:
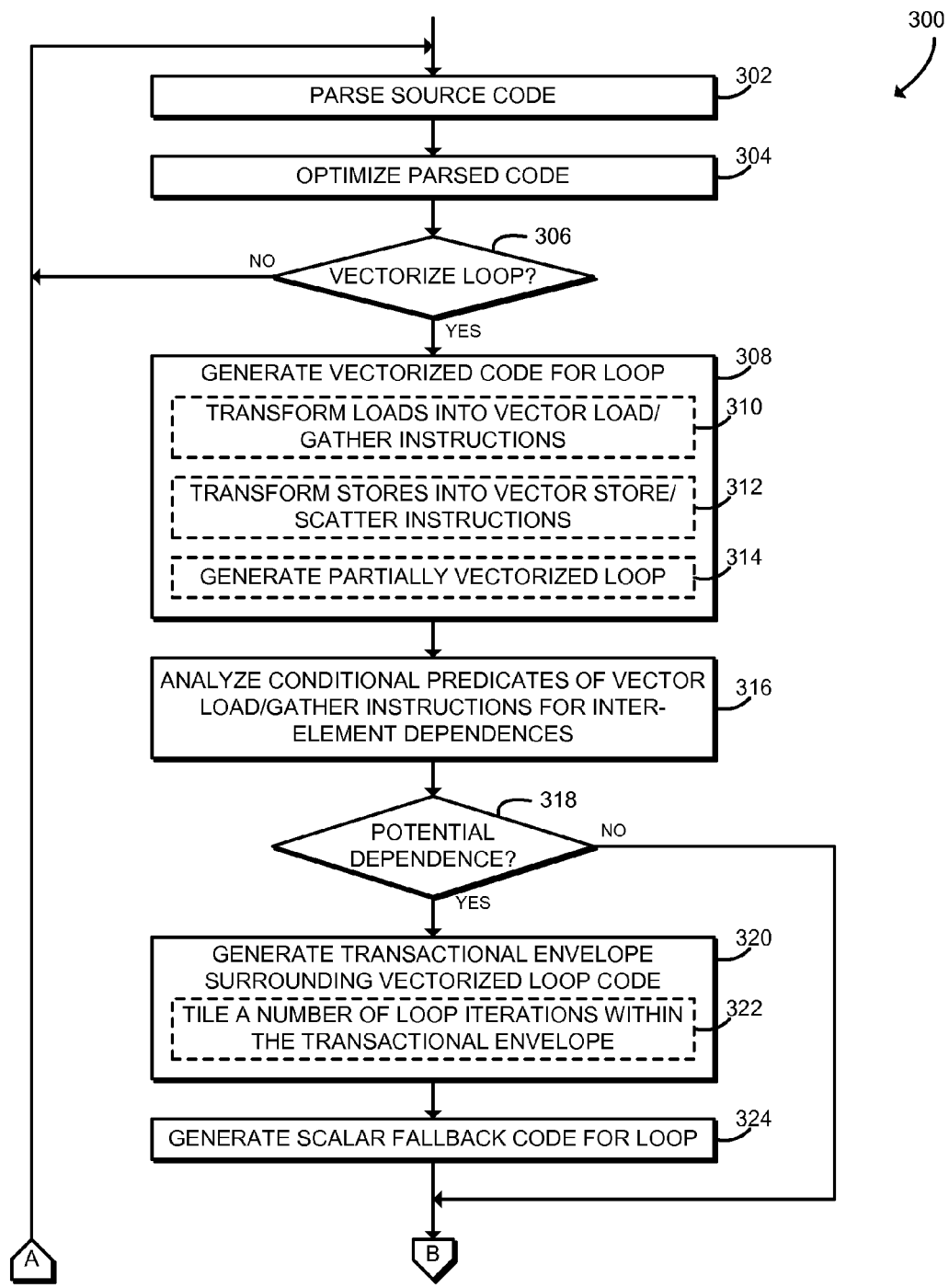
FIGS. 3A and 3B are a simplified flow diagrams of at least one embodiment of a method for automated loop vectorization that may be executed by the computing device of FIGS. 1 and 2.

Referring now to FIG. 3A, in use, the computing device 100 may execute a method 300 for automatically vectorizing a loop within the source code 202. The method 300 may be executed by the compiler 130 during compilation of the source code 202. The method 300 begins in block 302, in which the compiler 130 parses the source code 202. During parsing, the compiler 130 may generate an in-memory representation of the source code 202 that may be analyzed and modified by later stages of the compiler 130. For example, the compiler 130 may generate an abstract syntax tree ("AST") or an intermediate representation of the source code 202. The intermediate representation may be embodied as a graph structure connecting basic blocks of instructions targeting an abstract computing device.

In block 304, the computing device 100 optimizes the parsed code previously generated by the compiler 130. The compiler 130 may analyze the in-memory representation of the source code 202 to identify potential optimizations. The compiler 130 may optimize the code by replacing, rewriting, or otherwise transforming the in-memory representation of the source code 202.

In block 306, the computing device 100 determines whether to vectorize a loop within the source code 202. Vectorization is a potential "optimization" that may be performed by the compiler 130. The computing device 100 may detect a loop in the source code 202 during the parse or analysis stage. The method for detecting a loop may depend on the internal representation of the source code 202 produced by the parse stage. For example, given an AST representation, the computing device 100 may simply identify a loop node in the tree. Given an intermediate representation, the computing device 100 may analyze graph edges to identify groups of instructions forming a loop. The computing device 100 may determine whether or not to vectorize the loop based on any appropriate criteria, for example available vector hardware support, loop size, memory alignment, user preference, or any other criteria. If the computing device 100 determines not to vectorize a loop, the method 300 loops back to block 302 to continue parsing the source code 202. If the computing device 100 determines to vectorize the loop, the method 300 advances to block 308.

In block 308, the computing device 100 generates vectorized code for the loop within the source code 202. The computing device 100 may analyze the loop and/or generate vectorized output code using the in-memory representation of the source code 202 that may be analyzed and modified by the compiler 130. Generating the vectorized code may include generating a series of vector instructions corresponding to the body of the loop in the source code 202. Each vector instruction performs an operation on a number of operands, or elements. Each element of the vector instruction may correspond to a particular scalar iteration of the original source code 202 loop. For example, given four-element vector instructions, each generated vector instruction may operate on four elements corresponding to four scalar iterations of the loop. The generated vector code may also include a loop, but the vectorized loop may perform fewer iterations than the original scalar loop in the source code 202. For example, the vectorized loop may iterate with a stride length equal to the number of elements in the vector instructions. Vectorization may improve performance because each vector instruction may be completed in the same or a similar amount of time as a corresponding scalar instruction.

In some embodiments, in block 310 the computing device 100 may transform scalar loads from the source code 202 into one or more vector load or gather instructions. A vector load instruction may load a contiguous block of data from the memory 128 into a vector register of the processor 120.

A vector gather instruction may load non-contiguous data from the memory 128 into a vector register of the processor 120. For example, the vector gather instruction may include operands identifying a base memory address and a series of offset indices that are used to load particular memory locations into the vector register. When executed, the vector load and/or gather instruction may generate an exception to be handled by the processor 120. For example, a page fault, general protection fault, segmentation fault, or other exception may occur when a vector load and/or gather instruction accesses an invalid memory location or a memory location that is not allowed to be accessed by a particular program.

Similarly, in some embodiments, in block 312 the computing device 100 may transform scalar stores from the source code 202 into one or more vector store or scatter instructions. A vector store instruction may write a contiguous block of data from a vector register of the processor 120 into the memory 128. A vector scatter instruction may write non-contiguous data from a vector register of the processor 120 into the memory 128. For example, the vector scatter instruction may include operands identifying a base memory address and a series of offset indices that are used to write particular memory locations from the vector register. When executed, the vector store and/or scatter instruction may generate an exception to be handled by the processor 120. For example, a page fault, general protection fault, segmentation fault, or other exception may occur when a vector store and/or scatter instruction accesses an invalid memory location or a memory location that is not allowed to be accessed by a particular program.

In block 314, the computing device 100 may generate a partially vectorized loop for the loop of the source code 202. A partially vectorized loop performs vector operations for as many vector elements as possible for each iteration of the vectorized loop. Any vector elements that may not be performed in a particular vector iteration may be executed in a future vector iteration. Thus, partial vectorization operates similarly to a system having a variable vector length up to a particular maximum vector length. The partially vectorized loop may be generated using particular instructions of the processor 120 supporting partial vectorization by extracting an element from a vector based on a predicate mask, for example as described by International Pub. No. WO 2013/095616.

In block 316, the computing device 100 analyzes conditional predicates of vector load and/or gather instructions for potential inter-element dependences. In other words, the computing device 100 determines whether a load is guarded by a condition that may be updated by an earlier scalar iteration included in the same vector iteration. The analysis may be performed on the source code 202, any intermediate representation of the source code 202, or on a representation of the generated vectorized loop body.

Referring now to FIG. 4A, pseudocode 400 illustrates source code 202 that includes conditional predicates of a vector load and/or gather instruction with potential inter-element dependences. Conditional statement 402 determines whether arr1[i] is less than min_x. Statements 404, 406, 408 are conditional upon statement 402; that is, statements 404, 406, 408 are only executed if statement 402 evaluates to true. Thus, in some embodiments, the value of statement 402 may be used as a conditional predicate to determine whether to execute statements 404, 406, 408. Statement 404 includes a read from the memory location arr1[i]. Statement 406 includes a read from the memory location arr3[idx], where idx is an array index previously read from the memory location arr2[i]. Thus, statements 404, 406 may be vectorized using a vector load and a vector gather instruction, respectively. Conditional statement 408 determines whether x is less than min_x. Statement 410 is conditional upon statement 408; that is, statement 410 is only executed if statement 408 evaluates to true. Statement 410 sets the value of min_x. As described above, conditional statement 402 reads the value of min_x. Thus, the outcome of the conditional statement 402 may depend on previous iterations of the loop, in particular any assignments to min_x in previous iterations of the loop.

Figure 4B:
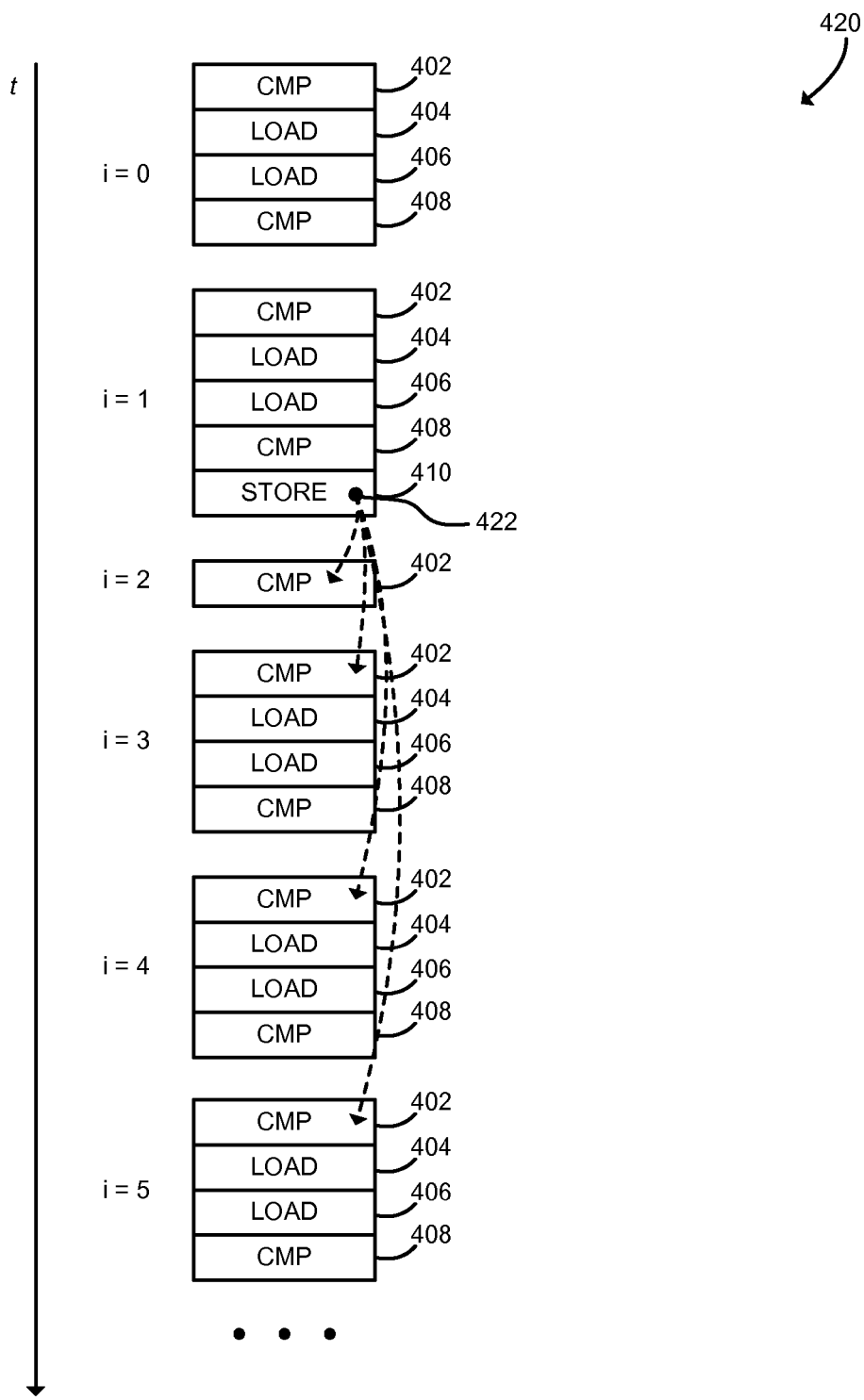
FIG. 4B is a schematic diagram of one embodiment of scalar execution of the source code loop of FIG. 4A.

Referring now to FIG. 4B, schematic diagram 420 illustrates an embodiment of scalar execution of the pseudocode 400. The schematic diagram 420 illustrates six scalar iterations of the loop, for i=0 through i=5. Of course, in other embodiments many more iterations may be executed. The diagram 420 identifies a subset of instructions that may be executed by the computing device 100, labeled by their associated statements in the pseudocode 400. The first iteration executes a comparison instruction associated with statement 402, two load instructions associated with statements 404, 406, and a comparison statement associated with the statement 408. In the illustrated example, the statement 408 evaluates to false, so the statement 410 is not executed in the first iteration. The second iteration executes a comparison instruction associated with statement 402, two load instructions associated with statements 404, 406, and a comparison statement associated with the statement 408. The statement 408 evaluates to true, so the statement 410 is executed. Execution of the statement 410 establishes a dependence 422 between the statement 410 of the second iteration and the statements 402 of the third iteration, the fourth iteration, the fifth iteration, the sixth iteration, and any further iterations of the loop. In other words, the updated value assigned to min_x in the second iteration must be used for the comparison statement 402 in later iterations.

Figure 4C:
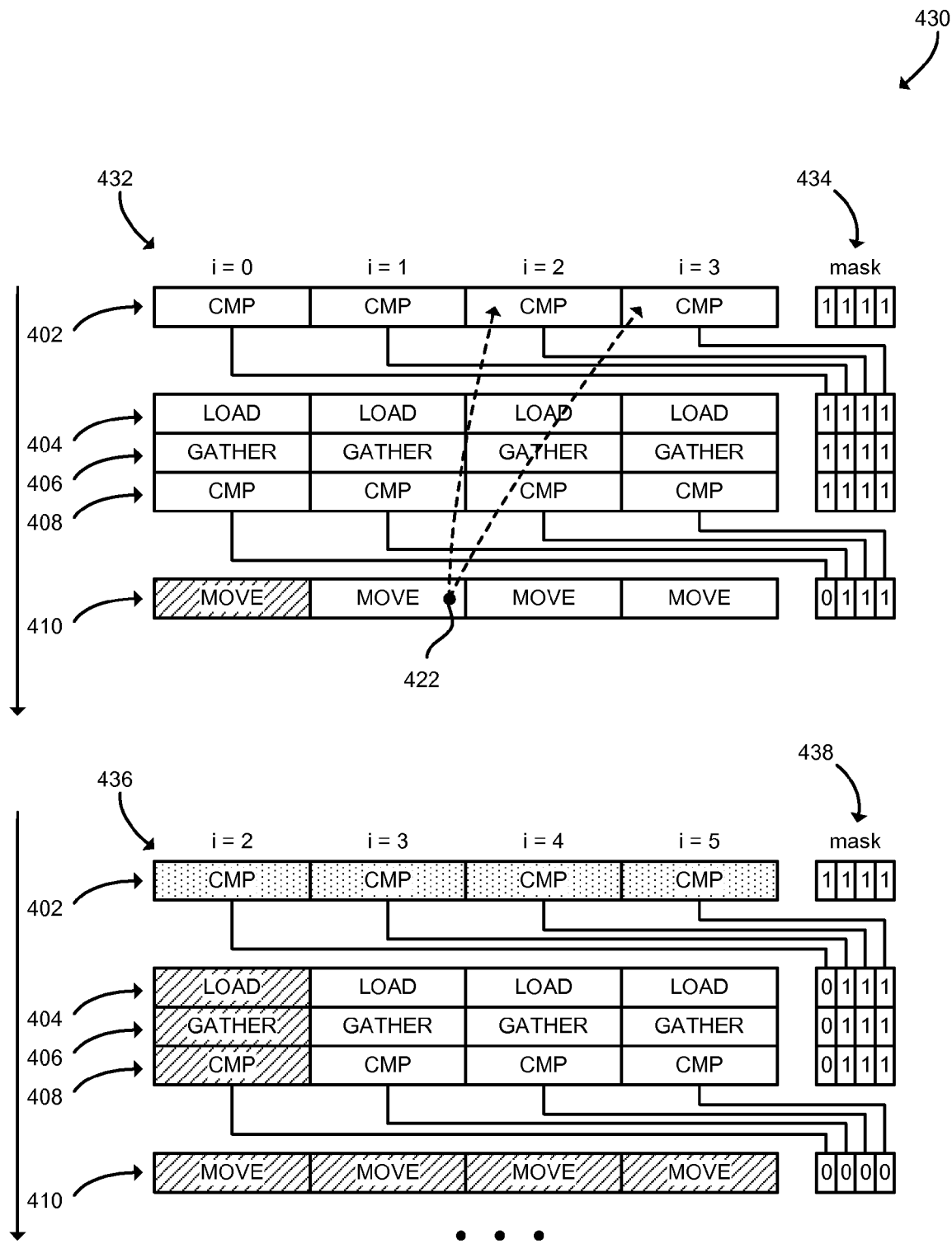
FIG. 4C is a schematic diagram of one embodiment of vector execution of the source code loop of FIG. 4A.

Referring now to FIG. 4C, schematic diagram 430 illustrates an embodiment of vector execution of the pseudocode 400. The table 432 illustrates the elements of each vector instruction, and the mask 434 illustrates a predicate mask for each instruction. Statement 402 is implemented as a vector compare instruction with every bit of the mask 434 set. In other words, a compare operation is performed that corresponds to each of the iterations i=0 through i=3. The results of the compare operation are used to calculate the predicate mask 434 for later instructions. In the illustrative example, the comparison is true for all four iterations, so the mask is 1111. Statements 404, 406 are executed as a vector load and a vector gather instruction, respectively, again performing an operation for each iteration. Statement 408 is executed as a vector compare instruction and generates the predicate mask 434 for the statement 410. In the illustrative embodiment, the calculated predicate mask is 0111, meaning that the statement 410 should be executed for iterations i=1 through i=3, but not for i=0. The statement 410 includes a vector store instruction. However, as described above, the store instruction associated with iteration i=1 of the statement 410 establishes the dependence 422 with the compare instructions of statement 402 of iterations i=2 and i=3. Therefore, the calculation of the predicate mask 434 performed by statement 402 may have been incorrect.

The table 436 and the corresponding predicate mask 438 illustrate correct operation of the pseudocode 400, accounting for the dependence 422. In the illustrative example, vector execution of the pseudocode 400 has been restarted at the iteration i=2. In other words, the pseudocode 400 has been partially vectorized. As shown, the comparison instructions of statement 402 for iterations i=2 through i=5 have been recalculated based on the dependence 422. The corrected statement 402 generates a predicate mask 438 of 0111. Therefore, the instructions for the statements 404, 406, 408, 410 should not be executed for iteration i=2. In particular, correct calculation of the predicate mask 438 indicates that execution of the load instruction 404 or the gather instruction 406 for the iteration i=2 is unexpected and therefore may access invalid memory addresses, unauthorized memory locations, or otherwise cause an exception. Thus, to ensure correct operation, a vectorized implementation of the pseudocode 400 should not cause exceptions for vector loads that should not have been executed (e.g., instructions 404, 406 for iteration i=2 as shown in the table 432).

Referring back to FIG. 3A, after analyzing for inter-element conditional dependences in block 316, in block 318 the computing device 100 determines whether a potential dependence exists. As described above, potential conditional dependences may cause a vectorized implementation of the loop body to execute memory reads that should not be reached in scalar execution of the loop. If no potential dependences exist, the method 300 advances to block 326 shown in FIG. 3B, as described below. If one or more potential dependences exist, the method 300 branches to block 320.

In block 320, the computing device 100 generates a transactional envelope surrounding the vectorized loop code. The transactional envelope may be embodied as any technique causing the vectorized loop code to be executed in a hardware transactional memory mode of the processor 120. For example, the transactional envelope may be embodied as particular compiler intrinsic functions or hardware instructions of the processor 120 to cause the processor 120 to enter hardware transactional memory mode. Additionally or alternatively, the transactional envelope may be embodied as a higher-level language feature such as a transactional or atomic block, statement, function, or other structure. Wrapping the vectorized loop code in a transaction allows the vectorized code to be executed speculatively. Any exceptions encountered during execution of the vectorized code may cause the transaction to be aborted and any changes to memory to be rolled back without any modification to the exception-handling logic of the computing device 100. The computing device 100 may wrap each iteration of the vectorized loop body in a single transaction. In that embodiment, an abort and rollback affects only the most recent vector iteration. In some embodiments, in block 322 the computing device 100 may tile a number of iterations of the vectorized loop body within the transactional envelope. By increasing the number of iterations for each transaction and thereby reducing the total number of transactions required, the computing device 100 may improve performance by reducing the required transaction setup and/or commit time. The optimal number of vector iterations per transaction may depend on characteristics of the vectorized loop code as well as the available hardware resources of the computing device 100 (e.g., storage space for speculative transactional memory operations).

In block 324, the computing device 100 generates scalar fallback code for the loop that is associated with the transactional envelope. The scalar fallback code is executed when an exception occurs within the vectorized code. The scalar fallback code may be similar to code ordinarily generated for the loop without automatic vectorization. The scalar fallback code may be associated with the transaction using any available technique, including using a compiler intrinsic function or a hardware instruction particular to the processor 120, or using a higher-level language feature.

Referring now to FIG. 5, pseudocode 500 illustrates an embodiment of vectorized code that may be generated for a loop in the source code 202. The generated vector code includes a loop structure 502. The loop 502 iterates over N total iterations with stride L, where L is the vector length. As described above, the computing device 100 may support one or more particular vector lengths, for example four elements per vector, eight elements per vector, or another number. In each iteration of the loop 502, the vector iteration variable $\vec{i}$ includes L consecutive index values, for example, $\vec{i}$=[0, 1, . . . , L−1]. Additionally, or alternatively, in some embodiments the loop 502 may be partially vectorized, meaning that less than L scalar iterations may be processed in each vector iteration. A partially vectorized embodiment is further described below in connection with FIGS. 9A-9C. The transaction statement 504 establishes the transactional envelope for each iteration of the loop 502. The vectorized loop body 506 is included within the transaction statement 504. The vectorized loop body 506 includes at least one conditional vector load and/or gather instruction 508. As described above, the vector load and/or gather instruction 508 may dynamically generate an exception. The catch statement 510 associates scalar fallback code 512 with the transaction statement 504. The scalar fallback code 512 includes L scalar iterations corresponding to the contents of the vector iteration variable $\vec{i}$. Additionally or alternatively, in some embodiments the scalar fallback code 512 may process less than L scalar iterations. For example, the dynamic vector length may be less than L, for when the trip count for the scalar loop (or the last block of scalar loop) is less than L, or when the loop 502 includes a break statement. In use, if an exception is triggered in the transaction 504, all memory changes performed during that transaction are discarded and/or rolled back, and the scalar fallback code 512 is executed. After the transaction 504 or the scalar fallback code 512 is completed, the loop 502 continues to the next vector iteration.

Referring now to FIG. 6, pseudocode 600 illustrates an embodiment of vectorized code including the loop tiling optimization that may be generated for a loop in the source code 202. Similar to the generated pseudocode 500 described above, the generated pseudocode 600 includes the loop 502, the transaction statement 504, the vectorized loop body 506 including the conditional vector loads and/or gathers 508, the catch statement 510, and the scalar fallback code 512. The pseudocode 600 also includes an inner tile loop 602 included within the transaction 504 but surrounding the vectorized loop body 506. The inner tile loop 602 repeats the vectorized loop body 506 T times, which may improve performance by reducing the computational cost of creating and committing transactions. Of course, as described above in some embodiments the loop 502 may be partially vectorized, meaning that less than L scalar iterations may be processed in each vector iteration. A partially vectorized embodiment is further described below in connection with FIGS. 9A-9C. The scalar fallback code 512 includes scalar code for L×T iterations; that is, the scalar fallback code 512 performs scalar calculations for all operations that would be performed within the inner tile loop 602. Similar to as described above, in some embodiments the scalar fallback code 512 may process less than L×T scalar iterations. For example, the dynamic vector length for a vector iteration may be less than L, for when the trip count for the scalar loop (or the last block of scalar loop) is less than L×T, or when the loop 502 includes a break statement.

Figure 3B:
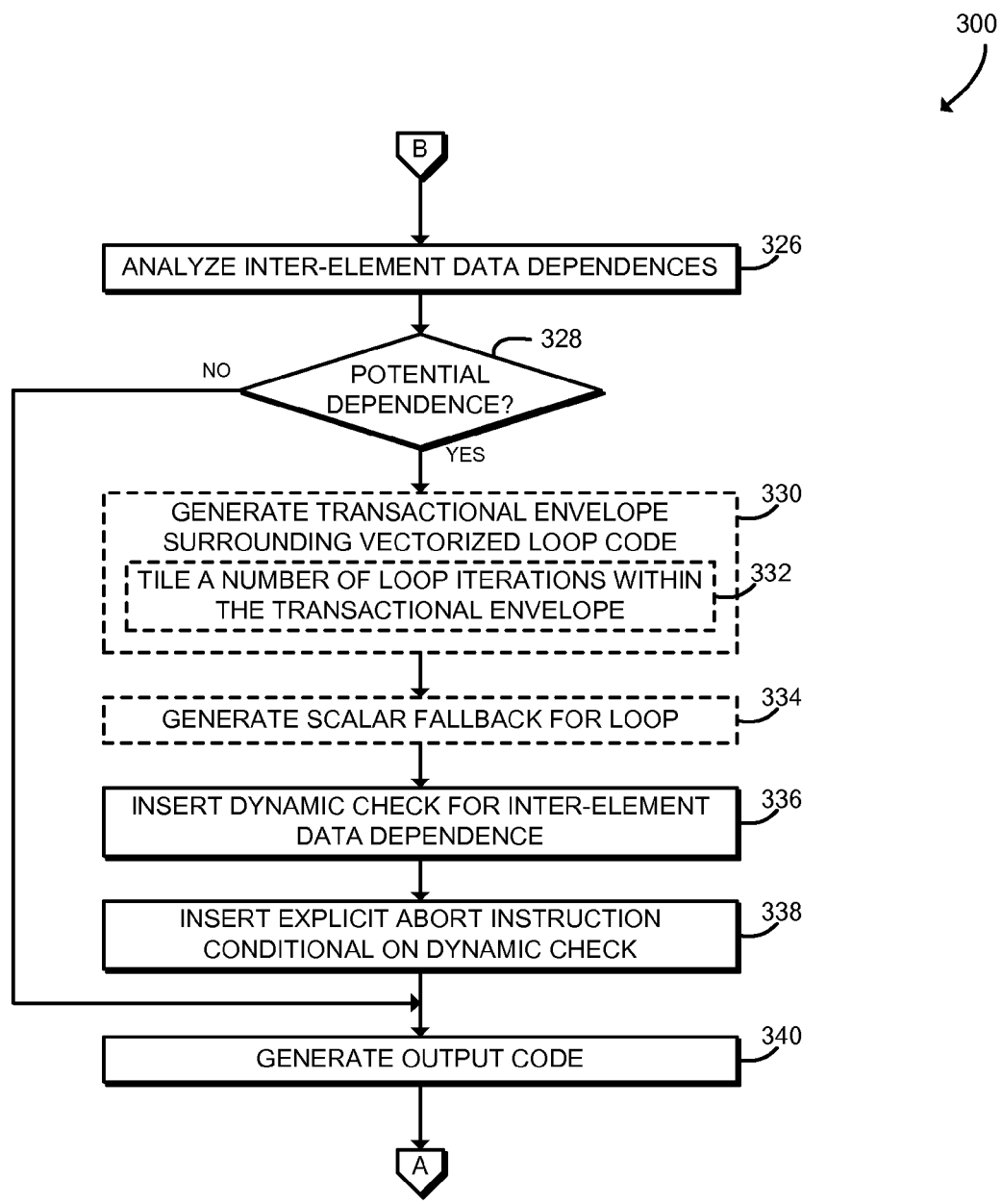

Referring back to FIG. 3A, after generating the scalar fallback code in block 324, the method 300 advances to block 326, shown in FIG. 3B. In block 326, the computing device 100 analyzes for inter-element communication of data through memory. In other words, the computing device 100 analyzes for potential data dependences between different scalar iterations of the loop that may be included in the same vector iteration.

Figures 7A, 7B:
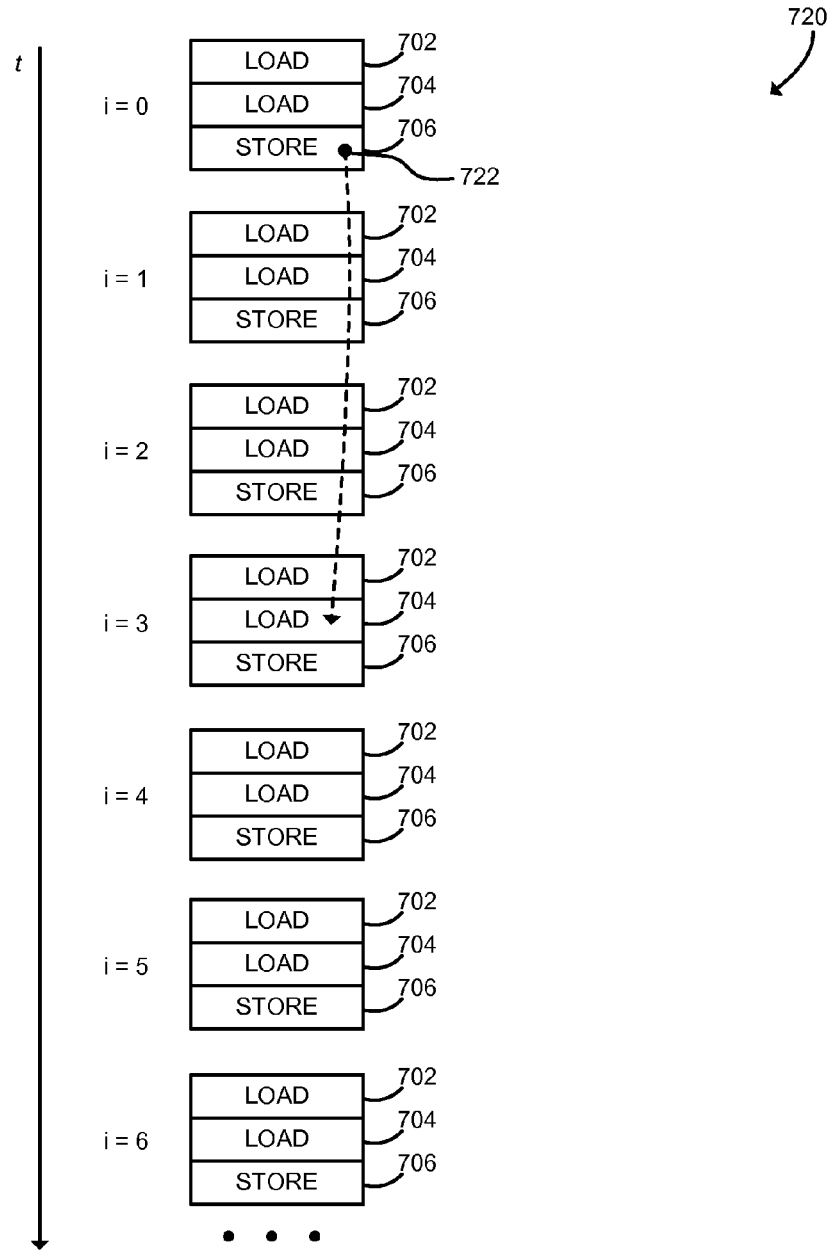
FIG. 7A illustrates example pseudocode of a source code loop.
FIG. 7B is a schematic diagram of one embodiment of scalar execution of the source code loop of FIG. 7A.

Referring now to FIG. 7A, pseudocode 700 illustrates source code 202 that includes potential inter-element data dependences. Statement 702 includes a load from the memory location arr2[i], stored in the variable idx. The value of the variable idx thus depends on the contents of the memory array arr2 and may not be determined at compile time. Statement 704 includes a load from the memory location arr3[idx]. Statement 706 includes a store to the memory location arr3[idx]. Because the value of idx is not restricted by the iteration variable i, references to arr3[idx] in different iterations of the loop may reference the same location in memory. In other words, one iteration of the loop may store a value in a location in memory that is loaded in a later iteration. Thus, a potential data dependence exists between statements 704, 706 in different iterations.

Referring now to FIG. 7B, schematic diagram 720 illustrates an embodiment of scalar execution of the pseudocode 700. The schematic diagram 420 illustrates seven scalar iterations of the loop for i=0 through i=6. Of course, in other embodiments many more iterations may be executed. The diagram 720 identifies a subset of instructions that may be executed by the computing device 100, labeled by their associated statements in the pseudocode 700. The first iteration executes a load instruction associated with statement 702, a load instruction associated with statement 704, and a store instruction associated with statement 706. The dependence 722 illustrates that memory location to which data is stored by the instruction 706 of the iteration i=0 is later accessed by the load instruction 704 of the iteration i=3. Thus, in the illustrative scalar execution 720 of the pseudocode 700, an actual dependence 722 exists between the iterations i=0 and i=3.

Figures 7C, 8:
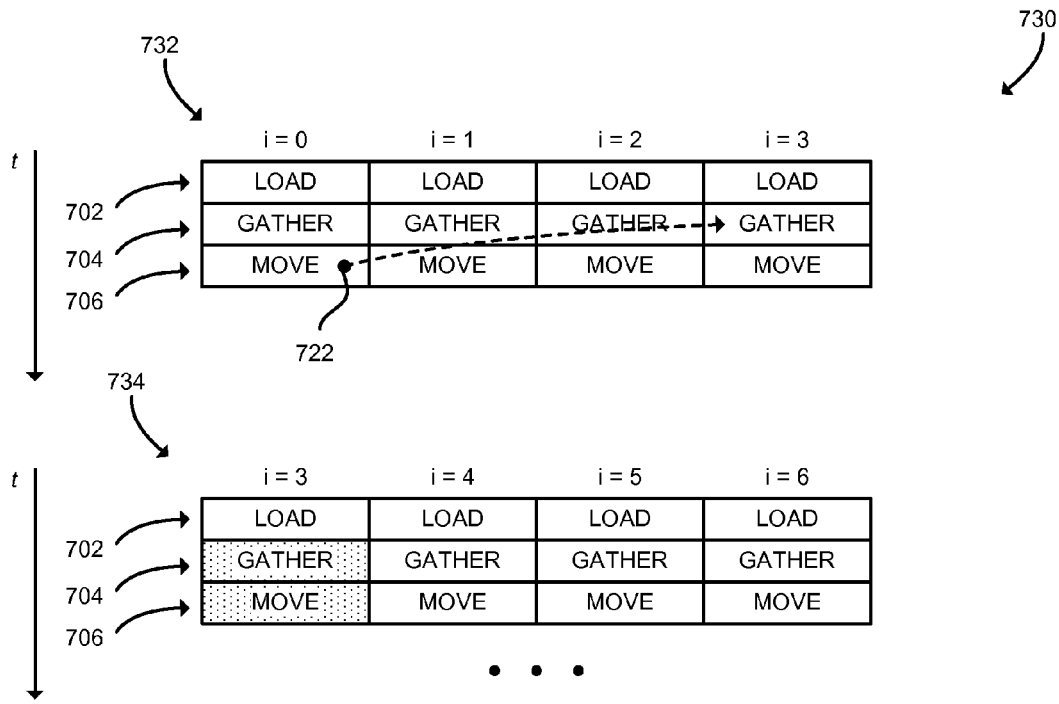
FIG. 7C is a schematic diagram of one embodiment of vector execution of the source code loop of FIG. 7A.
FIG. 8 illustrates example pseudocode of vectorized code with a dynamic memory dependency check that may be generated by the computing device of FIGS. 1 and 2.

Referring now to FIG. 7C, schematic diagram 730 illustrates an embodiment of vector execution of the pseudocode 700. The table 732 illustrates the elements of each vector instruction. Statement 702 is implemented as a vector load instruction for iterations i=0 through i=3. Statement 704 is implemented as a vector gather instruction for iterations i=0 through i=3. Statement 706 is illustrated as a vector move instruction for iterations i=0 through i=3. The dependence 722 illustrates that the element i=0 of the instruction 706 stores data at a memory location that was loaded by the element i=3 of the instruction 704. Thus, the data dependence 722 has caused incorrect execution of the pseudocode 700. The table 734 illustrates correct operation of the pseudocode 700, accounting for the dependence 722. In the illustrative example, vector execution of the pseudocode 700 has been restarted at the iteration i=3. In other words, the pseudocode 700 has been partially vectorized. As shown, the values associated with element i=3 of the gather instruction 704 and the move instruction 706 have been updated.

Referring back to FIG. 3B, after analyzing for inter-element data dependences in block 326, in block 328 the computing device 100 determines whether a potential data dependence exists. As described above, potential data dependences—that is, potential communication of data between vector elements through memory—may cause incorrect execution. If no potential data dependences exist, the method 300 branches ahead to block 340 to generate output code, described below. If one or more potential data dependences exist, the method 300 branches to block 330.

In block 330, the computing device 100 may generate a transactional envelope surrounding the vectorized loop body. The computing device 100 may not generate a transactional envelope if a transactional envelope was already generated in connection with block 320, described above. The description of the transactional envelope in connection with block 320, above, is also applicable to block 330 and is not repeated here. Similarly, in some embodiments in block 332 the computing device 100 may tile a number of iterations of the vectorized loop body within the transactional envelope. The description of loop tiling in connection with block 322, above, is also applicable to block 332 and is not repeated here.

In block 334, the computing device 100 may generate scalar fallback code for the loop that is associated with the transactional envelope. The computing device 100 may not generate scalar fallback code if the scalar fallback code was already generated in connection with block 324, above. The description of scalar fallback code in connection with block 324, above, is also applicable to block 334 and is not repeated here.

In block 336 the computing device 100 inserts a dynamic check for inter-element data dependence into the vectorized loop code prior to the potential data dependence. The computing device 100 may include a conditional statement, a conditional predicate, or any other statement to determine, at runtime, whether data values may be communicated in memory to other elements of the same vector iteration. In block 338, the computing device inserts an explicit transactional abort instruction conditioned upon the results of the dynamic check for inter-element communication. The explicit transactional abort instruction causes the current transaction to abort and/or roll back. Therefore, during execution of the generated code, upon detection of an actual data conflict between elements within the same vector iteration, the transaction is expressly aborted, and scalar fallback code may be executed.

Referring now to FIG. 8, pseudocode 800 illustrates an embodiment of vectorized code including a dynamic memory dependence check that may be generated for a loop in the source code 202. Similar to pseudocode 500 of FIG. 5, the pseudocode 800 includes the loop structure 502, the transaction statement 504, the vectorized loop body 506, the catch statement 510, and the scalar fallback code 512. Additionally, or alternatively, in some embodiments the loop 502 may be partially vectorized, meaning that less than L scalar iterations may be processed in each vector iteration. A partially vectorized embodiment is further described below in connection with FIGS. 9A-9C. The pseudocode 800 also includes a statement 802 including potential memory communication between elements in the same vector iteration. Prior to the statement 802, the pseudocode 802 includes a conditional statement 804 and an explicit abort statement 806. The conditional statement 804 dynamically, i.e. at runtime, determines whether actual memory communication occurs between elements of the same vector iteration. For example, the computing device 100 may compare array indices or other data to determine whether the same memory location is accessed by different elements of one or more vector instructions in the vectorized loop body 506. The explicit abort statement 806 is executed in response to the dynamic check being true. As illustrated, the scalar fallback code 512 processes all L scalar iterations; however, as described above, in some embodiments the scalar fallback code 512 may process less than L scalar iterations. For example, the dynamic vector length may be less than L, for when the trip count for the scalar loop (or the last block of scalar loop) is less than L, or when the loop 502 includes a break statement Referring back to FIG. 3B, in block 340, the computing device 100 generates output code based on the in-memory representation of the code segment after any optimization and/or loop vectorization. The generated code may be embodied as a list of instructions for a particular target computing device. The output code may be executable code 216, object code that may be linked to produce the executable code 216, or intermediate code that may be further processed by the compiler 130. For example, additional optimizations may be performed on the code segment in the same optimizer pass or in additional optimizer passes. After generating the output code, the method 300 loops back to block 302, shown in FIG. 3A, to continue parsing the source code 202.

Referring now to FIG. 9A, pseudocode 900 illustrates another example loop within source code 202 that may be vectorized by the computing device 100. The pseudocode 900 includes both potential conditional dependences as well as potential data dependences between scalar iterations.

Referring now to FIGS. 9B and 9C, pseudocode 902 illustrates an embodiment of vectorized loop code that may be generated by the computing device 100. The pseudocode 902 also illustrates a partially vectorized implementation of the vectorized loop body 506. The loop 502 is implemented as a loop label and corresponding conditional goto statement. The transaction 504 is implemented as a call to the intrinsic function _xbegin that causes the computing device 100 to enter hardware transactional memory mode. The intrinsic function _xbegin may map directly to a hardware instruction of the processor 120 such as the XBEGIN instruction. The vector load and/or gather instructions 508 are implemented as a MaskLoad function and a MaskGather function, both conditional upon the predicate mask k1. As shown, the value of k1 may depend on assignments to v_max_x, meaning that conditional execution of elements of the functions MaskLoad and MaskGather may depend on values calculated in previous scalar iterations. The else statement 510 (shown in FIG. 9C) implements the end of the transaction 504 and also indicates the scalar fallback code 512 that is executed upon a transactional abort.

As shown in FIG. 9B, the pseudocode 902 includes a statement 802 with a potential data conflict between vector elements. In particular, the statement 802 is implemented as a MaskedScatter function. The MaskedScatter function may write to memory locations previously read from by the MaskGather function of statement 508, representing a potential data conflict. The conditional statement 804 determines whether an actual data conflict exists with respect to the statement 802. In particular, the conditional statement 804 determines a value for k2 using the MaskedVConflict function. The MaskedVConflict function may, for example, compare the value of each element in a vector to each previous element in another vector to determine if identical values appear. The MaskedVConflict function may map to a specialized processor instruction as described in International Publication No. WO 2013/095606. The explicit abort instruction 806 is embodied as a call to the compiler intrinsic function _xabort, which may directly map to a hardware instruction of the processor 120 such as XABORT. The explicit abort instruction 806 is only executed if k2 has a non-zero value, meaning that an actual data conflict exists between elements.

The pseudocode 902 further includes a partially vectorized implementation of the vectorized loop body 506. In particular, the pseudocode 902 includes calls to the kfirsttrue, select, and popcnt functions, which are used to determine how many scalar iterations of the loop may be executed in each vector iteration (up to L iterations, that is, a full vector length). The kfirsttrue function may set all bits of the mask k3 up to the first set bit of k2. In other words, k3 may identify the vector elements from the start of the vector for which the condition k2 is not true (meaning those elements for which instructions predicated upon k2 will not be executed). The select function may broadcast the value of the last element in v_min_x for which k4 is set. In other words, the select function may broadcast the value set by the last valid scalar iteration to the other vector elements. The popcnt function may return the number of set elements of the mask k3, which indicates the number of scalar iterations processed. Those functions may be implemented in software, firmware, microcode, or may be implemented using specialized hardware instructions of the processor 120 to propagate conditionally evaluated values in a vector register, as described in International Pub. No. WO 2013/095617.

The disclosed code generation techniques have been described in the context of an optimizing compiler. It should be understood that the same or similar code generation techniques may be used to generate high-performance vectorized code without using an optimizing compiler and/or without automatic loop vectorization. For example, similar code generation techniques may be used to provide high-performance vectorized applications or libraries for use by applications executing on the computing device 100. In such example, the vectorized applications and/or libraries may be manually coded, generated ahead of time by an optimizing compiler, or generated using any other appropriate technique.

EXAMPLES

Illustrative examples of the technologies disclosed herein are provided below. An embodiment of the technologies may include any one or more, and any combination of, the examples described below.

Example 1 includes a computing device for loop vectorization, the computing device comprising an analysis module to detect a loop of a source program, the loop to define one or more scalar iterations and have a loop body for execution during each scalar iteration; and a vectorization module to generate a transactional code segment, wherein to generate the transactional code segment comprises to generate a vectorized implementation of the loop body within the transactional code segment as a function of the loop of the source program, the vectorized implementation to define one or more vector iterations and to include a vector memory read instruction capable of generation of an exception; and generate a non-transactional fallback code segment associated with the transactional code segment, the non-transactional fallback code to be executed in response to generation of an exception within the transactional code segment and comprising a scalar implementation of the loop body.

Example 2 includes the subject matter of Example 1, and wherein to generate the vectorized implementation comprises to generate one or more vector instructions, wherein each vector instruction includes a plurality of elements, each element to correspond to a scalar iteration of the loop body.

Example 3 includes the subject matter of any of Examples 1 and 2, and wherein the one or more vector instructions comprises a single instruction, multiple data (SIMD) instruction.

Example 4 includes the subject matter of any of Examples 1-3, and wherein to detect the loop of the source program comprises to detect a loop that includes a memory read dependent on a condition that may be updated in a previous scalar iteration included in the same vector iteration; and to generate the transactional code segment comprises to generate the transactional code segment in response to detection of the loop that includes the memory read.

Example 5 includes the subject matter of any of Examples 1-4, and wherein the vectorization module is further to detect a potential data dependence between two scalar iterations included in the same vector iteration; generate a dynamic check within the vectorized implementation of the loop body to determine whether an actual data dependence based on the potential data dependence exists; and generate an explicit transactional abort instruction within the vectorized implementation of loop body, the explicit transactional abort instruction to be executed in response to a determination that the actual data dependence exists.

Example 6 includes the subject matter of any of Examples 1-5, and wherein to detect the potential data dependence comprises to detect a first memory operation that addresses a memory location in a first scalar iteration and a second memory operation that addresses the memory location in a second scalar iteration different from the first scalar iteration and included in the same vector iteration as the first scalar iteration.

Example 7 includes the subject matter of any of Examples 1-6, and wherein to detect the loop of the source program comprises to detect a loop that has a memory load dependent on a condition that may be updated in a previous scalar iteration included in the same vector iteration.

Example 8 includes the subject matter of any of Examples 1-7, and wherein to generate the vectorized implementation comprises to generate a partially vectorized implementation that includes one or more vector instructions, each vector instruction to define a vector length; and wherein each vector iteration corresponds to up to the vector length number of scalar iterations of the loop body.

Example 9 includes the subject matter of any of Examples 1-8, and wherein to generate the partially vectorized implementation comprises to generate a partially vectorized implementation that includes a hardware partial vectorization support instruction.

Example 10 includes the subject matter of any of Examples 1-9, and wherein the hardware partial vectorization support instruction comprises a set up to and including first true in mask instruction, a set up to but not including first true in mask instruction, or a masked broadcast of last set element instruction.

Example 11 includes the subject matter of any of Examples 1-10, and wherein to generate the vectorized implementation comprises to generate a vectorized implementation of the loop body that includes a vector load instruction that is capable of generation of an exception.

Example 12 includes the subject matter of any of Examples 1-11, and wherein to generate the vectorized implementation comprises to generate a vectorized implementation of the loop body that includes a vector gather instruction that is capable of generation of an exception.

Example 13 includes the subject matter of any of Examples 1-12, and wherein to generate the transactional code segment comprises to include one vector iteration of the vectorized implementation of the loop body per transactional code segment.

Example 14 includes the subject matter of any of Examples 1-13, and wherein to generate the transactional code segment comprises to include a plurality of vector iterations of the vectorized implementation of the loop body per transactional code segment.

Example 15 includes method for loop vectorization, the method comprising detecting, by a computing device, a loop of a source program, the loop defining one or more scalar iterations and having a loop body for execution during each scalar iteration; generating, by the computing device, a transactional code segment, wherein generating the transactional code segment comprises generating a vectorized implementation of the loop body within the transactional code segment as a function of the loop of the source program, the vectorized implementation defining one or more vector iterations and including a vector memory read instruction that is capable of generating an exception; and generating, by the computing device, a non-transactional fallback code segment associated with the transactional code segment, the non-transactional fallback code to be executed in response to generation of an exception within the transactional code segment and comprising a scalar implementation of the loop body.

Example 16 includes the subject matter of Example 15, and wherein generating the vectorized implementation comprises generating one or more vector instructions, wherein each vector instruction includes a plurality of elements, each element corresponding to a scalar iteration of the loop body.

Example 17 includes the subject matter of any of Examples 15 and 16, and wherein generating the one or more vector instructions comprises generating a single instruction, multiple data (SIMD) instruction.

Example 18 includes the subject matter of any of Examples 15-17, and wherein detecting the loop of the source program comprises detecting a loop including a memory read dependent on a condition that may be updated in a previous scalar iteration included in the same vector iteration; and generating the transactional code segment comprises generating the transactional code segment in response to detecting the loop including the memory read.

Example 19 includes the subject matter of any of Examples 15-18, and further comprising detecting, by the computing device, a potential data dependence between two scalar iterations included in the same vector iteration; generating, by the computing device, a dynamic check within the vectorized implementation of the loop body to determine whether an actual data dependence based on the potential data dependence exists; and generating an explicit transactional abort instruction within the vectorized implementation of loop body, the explicit transactional abort instruction to be executed in response to determining that the actual data dependence exists.

Example 20 includes the subject matter of any of Examples 15-19, and wherein detecting the potential data dependence comprises detecting a first memory operation addressing a memory location in a first scalar iteration and a second memory operation addressing the memory location in a second scalar iteration different from the first scalar iteration and included in the same vector iteration as the first scalar iteration.

Example 21 includes the subject matter of any of Examples 15-20, and wherein detecting the loop of the source program comprises detecting a loop having a memory load dependent on a condition that may be updated in a previous scalar iteration included in the same vector iteration.

Example 22 includes the subject matter of any of Examples 15-21, and wherein generating the vectorized implementation comprises generating a partially vectorized implementation including one or more vector instructions, each vector instruction defining a vector length; and wherein each vector iteration corresponds to up to the vector length number of scalar iterations of the loop body.

Example 23 includes the subject matter of any of Examples 15-22, and wherein generating the partially vectorized implementation comprises generating a partially vectorized implementation including a hardware partial vectorization support instruction.

Example 24 includes the subject matter of any of Examples 15-23, and wherein generating the partially vectorized implementation including the hardware partial vectorization support instruction comprises generating a set up to and including first true in mask instruction, a set up to but not including first true in mask instruction, or a masked broadcast of last set element instruction.

Example 25 includes the subject matter of any of Examples 15-24, and wherein generating the vectorized implementation comprises generating a vectorized implementation of the loop body including a vector load instruction that is capable of generating an exception.

Example 26 includes the subject matter of any of Examples 15-25, and wherein generating the vectorized implementation comprises generating a vectorized implementation of the loop body including a vector gather instruction that is capable of generating an exception.

Example 27 includes the subject matter of any of Examples 15-26, and wherein generating the transactional code segment comprises including one vector iteration of the vectorized implementation of the loop body per transactional code segment.

Example 28 includes the subject matter of any of Examples 15-27, and wherein generating the transactional code segment comprises including a plurality of vector iterations of the vectorized implementation of the loop body per transactional code segment.

Example 29 includes a computing device comprising a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a computing device comprising means for performing the method of any of Examples 15-28.

Example 32 includes a computing device for loop vectorization, the computing device comprising means for detecting a loop of a source program, the loop defining one or more scalar iterations and having a loop body for execution during each scalar iteration; means for generating a transactional code segment, wherein the means for generating the transactional code segment comprises means for generating a vectorized implementation of the loop body within the transactional code segment as a function of the loop of the source program, the vectorized implementation defining one or more vector iterations and including a vector memory read instruction that is capable of generating an exception; and means for generating a non-transactional fallback code segment associated with the transactional code segment, the non-transactional fallback code to be executed in response to generation of an exception within the transactional code segment and comprising a scalar implementation of the loop body.

Example 33 includes the subject matter of Example 32, and wherein the means for generating the vectorized implementation comprises means for generating one or more vector instructions, wherein each vector instruction includes a plurality of elements, each element corresponding to a scalar iteration of the loop body.

Example 34 includes the subject matter of any of Examples 32 and 33, and wherein the means for generating the one or more vector instructions comprises means for generating a single instruction, multiple data (SIMD) instruction.

Example 35 includes the subject matter of any of Examples 32-34, and wherein the means for detecting the loop of the source program comprises means for detecting a loop including a memory read dependent on a condition that may be updated in a previous scalar iteration included in the same vector iteration; and the means for generating the transactional code segment comprises means for generating the transactional code segment in response to detecting the loop including the memory read.

Example 36 includes the subject matter of any of Examples 32-35, and further comprising means for detecting a potential data dependence between two scalar iterations included in the same vector iteration; means for generating a dynamic check within the vectorized implementation of the loop body to determine whether an actual data dependence based on the potential data dependence exists; and means for generating an explicit transactional abort instruction within the vectorized implementation of loop body, the explicit transactional abort instruction to be executed in response to determining that the actual data dependence exists.

Example 37 includes the subject matter of any of Examples 32-36, and wherein the means for detecting the potential data dependence comprises means for detecting a first memory operation addressing a memory location in a first scalar iteration and a second memory operation addressing the memory location in a second scalar iteration different from the first scalar iteration and included in the same vector iteration as the first scalar iteration.

Example 38 includes the subject matter of any of Examples 32-37, and wherein the means for detecting the loop of the source program comprises means for detecting a loop having a memory load dependent on a condition that may be updated in a previous scalar iteration included in the same vector iteration.

Example 39 includes the subject matter of any of Examples 32-38, and wherein the means for generating the vectorized implementation comprises means for generating a partially vectorized implementation including one or more vector instructions, each vector instruction defining a vector length; and wherein each vector iteration corresponds to up to the vector length number of scalar iterations of the loop body.

Example 40 includes the subject matter of any of Examples 32-39, and wherein the means for generating the partially vectorized implementation comprises means for generating a partially vectorized implementation including a hardware partial vectorization support instruction.

Example 41 includes the subject matter of any of Examples 32-40, and wherein the means for generating the partially vectorized implementation including the hardware partial vectorization support instruction comprises means for generating a set up to and including first true in mask instruction, a set up to but not including first true in mask instruction, or a masked broadcast of last set element instruction.

Example 42 includes the subject matter of any of Examples 32-41, and wherein the means for generating the vectorized implementation comprises means for generating a vectorized implementation of the loop body including a vector load instruction that is capable of generating an exception.

Example 43 includes the subject matter of any of Examples 32-42, and wherein the means for generating the vectorized implementation comprises means for generating a vectorized implementation of the loop body including a vector gather instruction that is capable of generating an exception.

Example 44 includes the subject matter of any of Examples 32-43, and wherein the means for generating the transactional code segment comprises means for including one vector iteration of the vectorized implementation of the loop body per transactional code segment.

Example 45 includes the subject matter of any of Examples 32-44, and wherein the means for generating the transactional code segment comprises means for including a plurality of vector iterations of the vectorized implementation of the loop body per transactional code segment.

The invention claimed is:

1. A computing device for loop vectorization, the computing device comprising:
   a processor; and
   one or more non-transitory, computer-readable storage media comprising a plurality of instructions that in response to being executed by the processor cause the computing device to:
   detect a loop of a source program, the loop to define one or more scalar iterations and have a loop body for execution during each scalar iteration;
   generate a transactional code segment, wherein to generate the transactional code segment comprises to generate a vectorized implementation of the loop body within the transactional code segment as a function of the loop of the source program, the vectorized implementation to define multiple tiled vector iterations of the vectorized loop body within a transactional envelope and to include a vector memory read instruction capable of generation of an exception; and
   generate a non-transactional fallback code segment associated with the transactional code segment, the non-transactional fallback code to be executed in response to generation of an exception within the transactional code segment, wherein the exception is based on a detection of a data dependence between two scalar iterations included in the same vector iteration of the loop and wherein the non-transactional fallback code segment comprises a scalar implementation of the loop body to execute the scalar iterations sequentially in response to generation of the exception.

2. The computing device of claim 1, wherein:
   to detect the loop of the source program comprises to detect a loop that includes a memory read dependent on a condition that may be updated in a previous scalar iteration included in the same vector iteration; and
   to generate the transactional code segment comprises to generate the transactional code segment in response to detection of the loop that includes the memory read.

3. The computing device of claim 1, wherein the one or more non-transitory, computer-readable storage media further comprises a plurality of instructions that in response to being executed by the processor cause the computing device to:
   detect a potential data dependence between two scalar iterations included in the same vector iteration, and
   wherein to generate a transactional code segment comprises to generate, in response to the detection of the potential data dependence, the transactional envelope surrounding vectorized loop code associated with the vectorized implementation of the loop.

4. The computing device of claim 3, wherein to detect the loop of the source program comprises to detect a loop that has a memory load dependent on a condition that may be updated in a previous scalar iteration included in the same vector iteration.

5. The computing device of claim 1, wherein:
   to generate the vectorized implementation comprises to generate a partially vectorized implementation that includes one or more vector instructions, each vector instruction to define a vector length; and
   wherein each vector iteration corresponds to up to the vector length number of scalar iterations of the loop body.

6. The computing device of claim 5, wherein to generate the partially vectorized implementation comprises to generate a partially vectorized implementation that includes a hardware partial vectorization support instruction, wherein the hardware partial vectorization support instruction comprises a set up to and including first true in mask instruction, a set up to but not including first true in mask instruction, or a masked broadcast of last set element instruction.

7. The computing device of claim 1, wherein to generate the vectorized implementation comprises to generate a vectorized implementation of the loop body that includes a vector load instruction that is capable of generation of an exception or a vector gather instruction that is capable of generation of an exception.

8. The computing device of claim 1, wherein to generate the transactional code segment comprises to include a plurality of vector iterations of the vectorized implementation of the loop body per transactional code segment.

9. A method for loop vectorization, the method comprising:
   detecting, by a computing device, a loop of a source program, the loop defining one or more scalar iterations and having a loop body for execution during each scalar iteration;
   generating, by the computing device, a transactional code segment, wherein generating the transactional code segment comprises generating a vectorized implementation of the loop body within the transactional code segment as a function of the loop of the source program, the vectorized implementation defining multiple tiled vector iterations of the vectorized loop body within a transactional envelope and including a vector memory read instruction that is capable of generating an exception; and
   generating, by the computing device, a non-transactional fallback code segment associated with the transactional code segment, the non-transactional fallback code to be executed in response to generation of an exception within the transactional code segment, wherein the exception is based on a detection of a data dependence between two scalar iterations included in the same vector iteration of the loop and wherein the non-transactional fallback code segment comprises a scalar implementation of the loop body to execute the scalar iterations sequentially in response to generation of the exception.

10. The method of claim 9, wherein:
detecting the loop of the source program comprises detecting a loop including a memory read dependent on a condition that may be updated in a previous scalar iteration included in the same vector iteration; and
generating the transactional code segment comprises generating the transactional code segment in response to detecting the loop including the memory read.

11. The method of claim 9, further comprising:
detecting, by the computing device, a potential data dependence between two scalar iterations included in the same vector iteration,
wherein generating a transactional code segment comprises generating, in response to the detection of the potential data dependence, the transactional envelope surrounding vectorized loop code associated with the vectorized implementation of the loop.

12. The method of claim 11, wherein detecting the loop of the source program comprises detecting a loop having a memory load dependent on a condition that may be updated in a previous scalar iteration included in the same vector iteration.

13. The method of claim 9, wherein:
generating the vectorized implementation comprises generating a partially vectorized implementation including one or more vector instructions, each vector instruction defining a vector length; and
wherein each vector iteration corresponds to up to the vector length number of scalar iterations of the loop body.

14. The method of claim 9, wherein generating the transactional code segment comprises including a plurality of vector iterations of the vectorized implementation of the loop body per transactional code segment.

15. One or more non-transitory, computer-readable storage media comprising a plurality of instructions that in response to being executed cause a computing device to:
detect a loop of a source program, the loop defining one or more scalar iterations and having a loop body for execution during each scalar iteration;
generate a transactional code segment, wherein to generate the transactional code segment comprises to generate a vectorized implementation of the loop body within the transactional code segment as a function of the loop of the source program, the vectorized implementation to define multiple tiled vector iterations of the vectorized loop body within a transactional envelope and including a vector memory read instruction that is capable of generating an exception; and
generate a non-transactional fallback code segment associated with the transactional code segment, the non-transactional fallback code to be executed in response to generation of an exception within the transactional code segment, wherein the exception is based on a detection of a data dependence between two scalar iterations included in the same vector iteration of the loop and wherein the non-transactional fallback code segment comprises a scalar implementation of the loop body to execute the scalar iterations sequentially in response to generation of the exception.

16. The one or more non-transitory, computer-readable storage media of claim 15, wherein:
to detect the loop of the source program comprises to detect a loop including a memory read dependent on a condition that may be updated in a previous scalar iteration included in the same vector iteration; and
to generate the transactional code segment comprises to generate the transactional code segment in response to detecting the loop including the memory read.

17. The one or more non-transitory, computer-readable storage media of claim 15, further comprising a plurality of instructions that in response to being executed cause the computing device to:
detect a potential data dependence between two scalar iterations included in the same vector iteration, and
wherein to generate a transactional code segment comprises to generate, in response to the detection of the potential data dependence, the transactional envelope surrounding vectorized loop code associated with the vectorized implementation of the loop.

18. The one or more non-transitory, computer-readable storage media of claim 17, wherein to detect the loop of the source program comprises to detect a loop having a memory load dependent on a condition that may be updated in a previous scalar iteration included in the same vector iteration.

19. The one or more non-transitory, computer-readable storage media of claim 15, wherein:
to generate the vectorized implementation comprises to generate a partially vectorized implementation including one or more vector instructions, each vector instruction defining a vector length; and
wherein each vector iteration corresponds to up to the vector length number of scalar iterations of the loop body.

* * * * *